Patented Sept. 25, 1951

2,569,282

UNITED STATES PATENT OFFICE 2,569,282

LIVESTOCK FEED

Richard J. Block, Scarsdale, N. Y., assignor to The Borden Company, a corporation of New Jersey No Drawing. Application July 13, 1950,
Serial No. 173,696

6 Claims. (Cl. 99—2)

This invention relates to a livestock feed for ruminants and the method of feeding the flora of the rumen. The invention is particularly useful in connection with a relatively inexpensive feed for cattle or sheep and will first be illustrated by description in connection with such use.

In the art of feeding these ruminants, it has been known for some time that urea may be admixed under certain circumstances to provide approximately 35% of the total nitrogen requirement of the feed. Larger amounts of urea have been found undesirable and it has been suggested (Chemical Abstracts, vol. 42 6659[1], 1948) that the unpalatability of the higher urea rations is due to the deleterious effect on the flora of the rumen.

I have now discovered a composition in which the urea may be fed in proportion to supply 50 to 65% or more of the total nitrogen requirement and at the same time, produce a feed that is palatable and generally satisfactory.

Briefly stated, my invention comprises a feed, either a high-nitrogen supplement or a feed ready for use, including a mixture of urea with a non-protein source of sulfur. In the preferred embodiment of the invention, the feed includes also an admixed conventional feed ingredient in proportion to lower the overall content of urea to about 4% to 15% and the total nitrogen content to a level within the range 2% to 8%, proportions here and elsewhere herein being expressed as parts by weight. I prefer to supply the non-protein sulfur in the form of an inorganic sulfur compound of which sodium sulfate is an example.

The invention comprises also the method of feeding rumen flora on a diet including a feed of the kind described, it being understood that a ruminant derives its food directly from such flora which are nourished directly by the feed.

That the sulfur component of these foods enters into metabolism within the animal has been proven by using, in a diary ration, radioactive sulfur ($S^{35}$) in the form of sodium sulfate containing this radioactive isotope of sulfur. Tests have shown that when the radioactive sulfur is fed in the form of the sodium sulfate, the protein of the animal's body comes to contain radioactive sulfur. This shows that the inorganic sulfate enters into the body processes and confirms the feeding experiments as to the activity of the inorganic sulfur in the animal metabolism.

The general method of mixing the components of my new feed is that which is commonly used for mixing urea with a livestock feed except that I incorporate in addition the admixed sulfur component. The source of sulfur is preferably incorporated in powdered form, to avoid grittiness.

As to kinds of materials, I use urea. It is an inexpensive source of non-protein nitrogen. There is no advantage in using ammonium carbamate (corresponding to hydrated urea) over the urea itself. Ammonium carbamate is known to be an important ingredient of commercial ammonium carbonate.

As the source of added sulfur in my feed I may use water-soluble or difficultly soluble inorganic compounds such as sodium, potassium, calcium. or ammonium sulfate, sulfites, sulfides, thiosulfates or other sulfur-containing compounds, or I may use elemental sulfur. The source of sulfur must be one that in the proportions used is non-toxic and of unobjectionable taste. In place of these inorganic forms of sulfur or in conjunction with one or more of them there may be used cystine, cysteine, methionine, acid hydrolysis products of keratins of which hydrolyzed waste feathers, hair and wool are examples; or like sulfur containing amino acids, proteins, or protein hydrolysates.

It is important that the selected sulfur compound be used in a certain proportion to the nitrogen content of the feed. Thus the proportion of the total sulfur present including that added and whatever sulfur may be present as part of another ingredient of the finished feed should be approximately 1 part of sulfur calculated as the element to 10 to 25 parts of the nitrogen content calculated also as the element. For best results I use a ratio of 1 of sulfur to 16 of nitrogen.

It is necessary in feeding that there be present some other ingredient in addition to the non-protein source of nitrogen and the added sulfur compound. These other ingredients are those that are conventional in feeds. Examples are ground corn, alfalfa meal, cottonseed meal, wheat bran, cut hay, or other common ingredients for livestock food. This added bulking ingredient is used in proportion to reduce the urea content of the finished mixed feed to a figure within the range 4% to 15% of urea and for most purposes within the range 4% to 8%. Mineral supplements and vitamin-supplying materials are used in conventional proportions.

The invention will be further illustrated by description in connection with the following specific examples of mixed supplements or feeds for ruminants.

Example 1

A feed supplement for use in mixing, to increase the nitrogen level of another feeding material, is made as follows:

| Ingredient: | Pounds |
|---|---|
| Urea | 6 |
| Sodium sulfate | 0.7 |
| Wheat bran | 10 |
| Ground corn | 55 |
| Cottonseed meal | 18 |
| Molasses | 8 |
| Minerals and salt | 2.3 |
| Total | 100.0 |

Example 2

A finished dairy feed is made of the following formula:

| Ingredient: | Pounds |
|---|---|
| Urea | 4 |
| Sodium sulfate | 0.5 |
| Ground oats | 25 |
| Hominy | 6 |
| Wheat bran | 20 |
| Molasses | 10 |
| Alfalfa meal 17% | 7.5 |
| Soybean oil meal (urease free) | 25 |
| Iodized salt | 1 |
| Bone meal | 1 |
| Total | 100.0 |

Example 3

A supplement for addition to a feed base is made by mixing urea and sodium sulfate in the following proportions:

| | Parts |
|---|---|
| Urea | 100 |
| Sodium sulfate, anhydrous | 13.1 |

The mixed ingredients are pelleted. They are then sold in that form for addition to feed bases low in nitrogen content.

Various other minerals, vitamins, and fortifying agents may be included in the pellets.

Also the mixture may be sold in powdered form.

Example 4

In the formulas of Examples 1, 2, and 3, the sodium sulfate is replaced by an equivalent weight (on the basis of sulfur content) of any one of the sulfates, bisulfates, thiosulfates, or other sulfur-containing compounds, including the sulfur-containing aminoacids or protein hydrolysates, referred to earlier herein as sources of the required sulfur.

The feeds made as described are satisfactory in use. They are palatable and of good biological value. The inorganic sulfur enters into metabolism as shown by the tests described above with radio-active sulfur isotope.

This application is a continuation in part of my earlier application, Serial No. 143,145, filed February 8, 1950 now abandoned.

It will be understood that it is intended to cover all changes and modifications of the examples of the invention herein chosen for the purpose of illustration which do not constitute departures from the spirit and scope of the invention.

What I claim is:

1. A feed composition for ruminants comprising urea as a non-protein source of nitrogen and an admixed non-protein source of sulfur, the urea and the admixed source of sulfur being in proportion to make the feed composition contain 10 to 25 parts by weight of nitrogen for 1 part of sulfur calculated as elemental sulfur.

2. The composition of claim 1 in which the admixed source of sulfur is sulfur in elemental form.

3. The composition of claim 1 in which the admixed source of sulfur is a non-toxic compound selected from the group consisting of water soluble inorganic metal sulfates, sulfites, sulfides and thiosulfates.

4. The composition of claim 1 in which the admixed source of sulfur is sodium sulfate.

5. The composition of claim 1 in which the admixed source of sulfur is calcium sulfate.

6. The feed composition of claim 1 in which there is admixed non-urea ruminant feed ingredients in proportion to bring the total nitrogen content of the mixed feed within the range 2% to 8%.

RICHARD J. BLOCK.

REFERENCES CITED

The following references are of record in the file of this patent:

UNITED STATES PATENTS

| Number | Name | Date |
|---|---|---|
| 309,502 | Wylam | Dec. 16, 1884 |
| 866,499 | Meusel | Sept. 17, 1907 |
| 2,508,599 | Elmslie | May 23, 1950 |

FOREIGN PATENTS

| Number | Country | Date |
|---|---|---|
| 530,675 | Great Britain | of 1940 |

OTHER REFERENCES

Chem. Ab., vol. 42, 6959$^1$, 1948.